(12) United States Patent
Dayle (10) Patent No.: US 6,225,920 B1
(45) Date of Patent: May 1, 2001

(54) PORTABLE COMPUTER APPARATUS FOR ASSISTING PERSONS WITH COGNITIVE DISABILITIES

(76) Inventor: Randy A. Dayle, P.O. Box 5356, 3733 Goldenrod Rd., Winter Park, FL (US) 32793-5356

( * ) Notice: Subject to any disclaimer, the term of this patent is extended or adjusted under 35 U.S.C. 154(b) by 0 days.

(21) Appl. No.: 09/059,741

(22) Filed: Apr. 14, 1998

(51) Int. Cl.[7] .................................................. G06F 3/00
(52) U.S. Cl. ............................. 341/21; 341/20; 345/337; 345/352; 345/353; 434/323
(58) Field of Search ................... 341/20, 22, 21; 345/168, 173, 169, 172, 352, 353, 337; 235/486, 441; 434/323, 236, 114

(56) References Cited

U.S. PATENT DOCUMENTS

| | | | |
|---|---|---|---|
| 5,206,671 | * | 4/1993 | Eydelman et al. .................... 351/203 |
| 5,227,614 | * | 7/1993 | Danielson ............................ 235/380 |
| 5,379,057 | * | 1/1995 | Clough et al. ....................... 345/173 |
| 5,513,308 | * | 4/1996 | Mori .................................... 345/352 |
| 5,588,839 | * | 12/1996 | Shimoda ............................. 434/114 |
| 5,813,863 | * | 9/1998 | Sloane et al. ....................... 434/236 |
| 5,978,595 | * | 11/1999 | Tanaka ................................ 345/352 |
| 6,042,009 | * | 3/2000 | Barrett ................................. 235/441 |
| 6,065,076 | * | 5/2000 | Sorenson ............................. 345/352 |

* cited by examiner

Primary Examiner—Michael Horabik
Assistant Examiner—Albert K. Wong
(74) Attorney, Agent, or Firm—Gilberto M. Villacorta; Pepper Hamilton LLP (57) ABSTRACT

A portable computer apparatus for assisting a cognitively impaired person to perform tasks in the person's particular living environment is disclosed. The portable computer apparatus presents a plurality of first level virtual buttons on a display for selection by the person. Each first level virtual button corresponds to a different selectable domain or selection type. The first level virtual buttons are configured to correspond to the abilities and life needs of a particular person. When selected, a first level virtual button causes a category, sub-category, task, task element or content element to be presented. A hierarchical content structure, custom-tailored to the life needs and abilities of the particular cognitively impaired individual is provided. A means is provided, by an authoring facility hosted on a separate PC, to develop the user's content and download it to the portable computer apparatus.

32 Claims, 10 Drawing Sheets

PORTABLE COMPUTER APPARATUS FOR ASSISTING PERSONS WITH COGNITIVE DISABILITIES

BACKGROUND OF THE INVENTION

The present invention relates to a computer apparatus/program for storing and displaying verbal and pictorial instructions to enable persons with developmental disabilities or memory center damage or deficiency to perform routine functions.

Various developmental disabilities (such as mental retardation and autism), traumatic brain injuries (TBI), and brain disorders and diseases (such as Alzheimer's) result in a person having temporary, long term, or permanent loss of short-term memory and other cognitive capabilities. In many cases, long term memory may be unaffected and very simple tasks can be learned. Other things, such as how to perform the steps of a job task, how to get home from a doctor's office, whether, when and how to take medications, for example, cannot be reliably remembered or mastered.

It is desirable for a computer with reminder capabilities and other assistance capabilities to be developed as a cognitive orthodic to augment the individual's ability to recall and perform routine tasks, as well as more involved tasks.

SUMMARY OF THE INVENTION

Accordingly, one object of the present invention is to provide a very small computer-based categorical and graphically oriented system for organizing, navigating and controlling the presentation of information for individuals who can benefit from assistive technology, such as those with cognitive or memory center disabilities. Within the context of this invention, "presentation" means the delivery of information structure navigational information, information content, and on-condition prompts to the user of the invention by means of displayed text, graphics, or video, audio output, or other media.

Another object of the present invention is to provide a computer-based environment for developing, maintaining and presenting individualized, user-specific information content.

In accordance with one embodiment of the present invention, a portable computing apparatus is provided for enabling a cognitively impaired person to function in a living environment. The portable computing apparatus includes a display for conveying output information to the person and for receiving input information from the person. The computing apparatus also includes a processor, coupled to the display, for providing output information to the display and receiving input information from the display. The computer apparatus further includes a non-volatile memory, coupled to the processor, for storing program code which, when executed by the processor, presents a plurality of first level virtual buttons on the display for selection by the person. Each first level virtual button corresponds to a different selectable category. The first level virtual buttons are configured to correspond to the abilities and life needs of a particular cognitively impaired person. The program code when executed by the processor detects selection of one of the first level virtual buttons by the person and in response causes a second level virtual button or information content to be presented to the user. A hierarchy of selections is thus formed.

A means is provided, by an authoring facility hosted on a separate PC, to develop the user's content and download it to the portable computer apparatus.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIGS. 2A–2C represents a typical hierarchy of selections the user can make on the disclosed computer apparatus.

DETAILED DESCRIPTION OF THE INVENTION

Figure 1A:
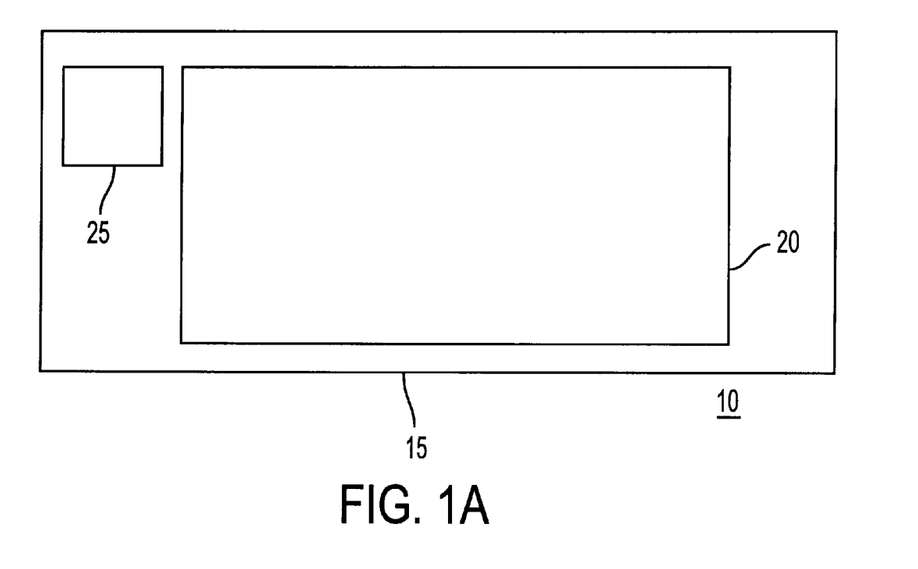
FIG. 1A is a representation of the disclosed portable computer apparatus for assisting persons with cognitive disabilities.

FIG. 1A depicts a portable computer apparatus 10 for assisting a cognitively impaired person. Computer apparatus 10 includes a housing 15 in which a touch-sensitive display 20 and a speaker 25 are situated.

Figure 1B:
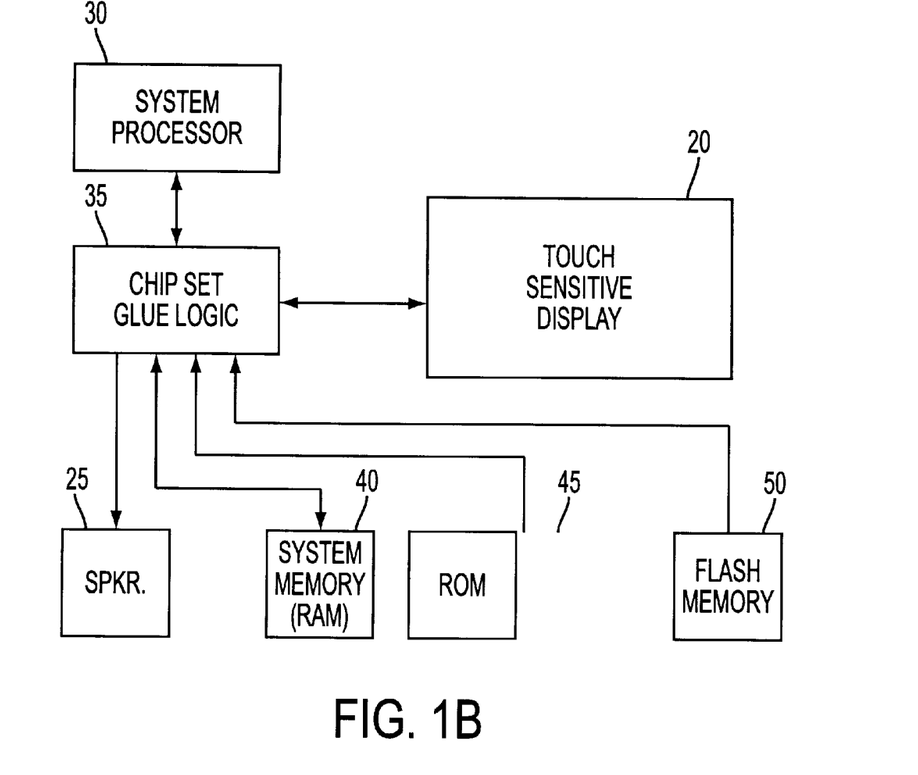
FIG. 1B is a high level block diagram of the portable computer apparatus of FIG. 1A.

FIG. 1B is a high level block diagram of computer apparatus 10. Computer apparatus 10 includes a system processor 30 which is coupled by a glue logic chip set 35 to speaker 25 and display 20. Display 20 provides guidance to the cognitively impaired user and allows the user to make selections from displayed choices which are represented by virtual buttons on the display as will be described in more detail later. System memory 40, read-only memory (ROM) 45 and FLASH memory 50 are coupled to system processor 30 via chip set 35 as shown. A battery (not shown) supplies computer apparatus 10 with DC power. Examples of computers which provide suitable hardware for portable computing apparatus 10 are the Apple MessagePad 2100 and other devices using the MS WinCE 2.X Palm PC specification. This computer includes a touch-sensitive display which enables the user to input data to the computer by touching the screen.

Figure 2A:
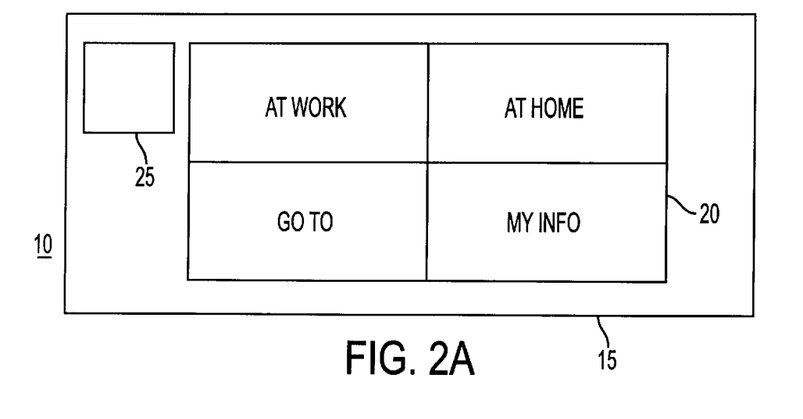
FIG. 2A illustrates first level selectable domains.

An example of the typical operation of portable computer apparatus 10 is helpful at this point. In one representative embodiment shown in FIG. 2A, when the user turns computer apparatus 10 on, four domains designated "AT WORK", "AT HOME", "GO TO" and "MY INFO" are displayed on display 20 as "virtual buttons". A virtual button is a simulated button displayed on the display. When the user presses the button, the button is selected and the computer recognizes this selection. In this manner, it appears to the user that a real button has been pressed.

Figure 2B:
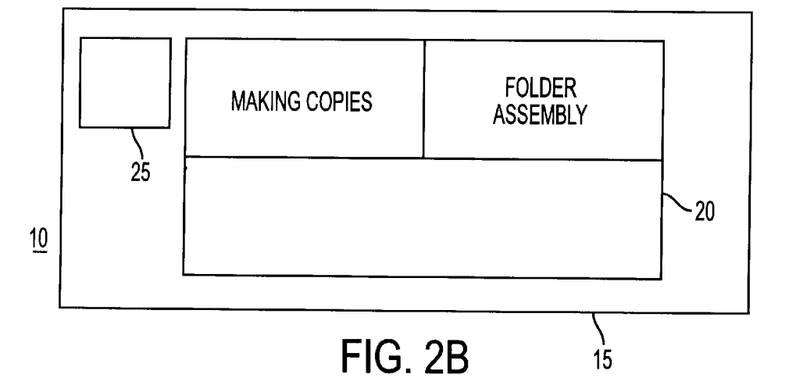
FIG. 2B illustrates second level selectable categories.
Figure 2C:
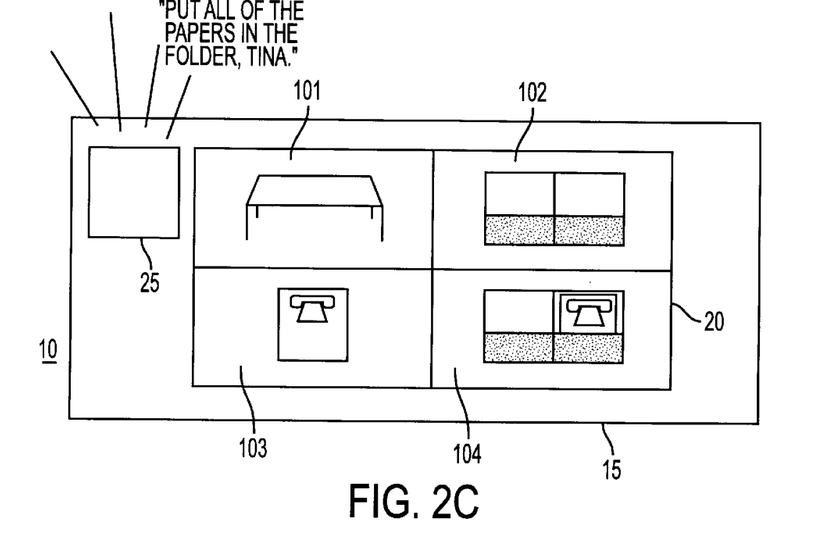
FIG. 2C illustrates the task elements of a sample folder assembly task for which the user can obtain assistance.

By pressing one of these virtual buttons representing the first level domain choices, the user indicates a selection and the computer apparatus proceeds to the next level as shown in FIG. 2B. For example, if the user selects the top level domain "AT WORK" in FIG. 2A., then two categories designated as "MAKING COPIES" and "FOLDER ASSEMBLY" are displayed on display 20 as virtual buttons as shown in FIG. 2B. In this particular example, if the user selects the category "FOLDER ASSEMBLY" by pressing the corresponding virtual button, then computer 10 displays four task elements 101, 102, 103 and 104 representing how the task appears to the user at key points during its performance, as shown in FIG. 2C. Task element 101 depicts a desk at which the user should begin the task. Task element 102 depicts a typical folder including two pockets. Task element 103 depicts an object to be placed in the folder. In this particular example, task element 103 shows a piece of paper with the image of a telephone on the uppermost portion thereof. Task element 104 shows a completed folder. Key elements of the assembly process are illustrated with an amount of detail corresponding to the user's particular cognitive ability.

It is noted that when the user presses the virtual button represented by task element 103 in FIG. 2C, computer 10 responds with the audio prompt "PUT ALL OF THE PAPERS IN THE FOLDER, TINA" or another appropriate response tailored for the cognitive level of the particular user. In one embodiment of the portable computer assistance device, the computer displays a representation of task elements, namely the steps to take to complete a task. Each task element depicts a graphic image of how the particular job or workpiece should look after completion of a task element. When the user sees that the workpiece appears to be the same as the appearance of the task element depicted on the computer display, the user touches that task element on the display. This confirms to the computer that this task element is completed. The computer then proceeds to present the next content element that the user needs to accomplish in the task sequence. In this case, the user is provided with a series of audio prompts delivered through speaker 25 along the way to completion of the task. It is again noted that the specific task elements, content elements and the media by which they are presented are tailored for the cognitive level of the particular user.

Figure 3A:
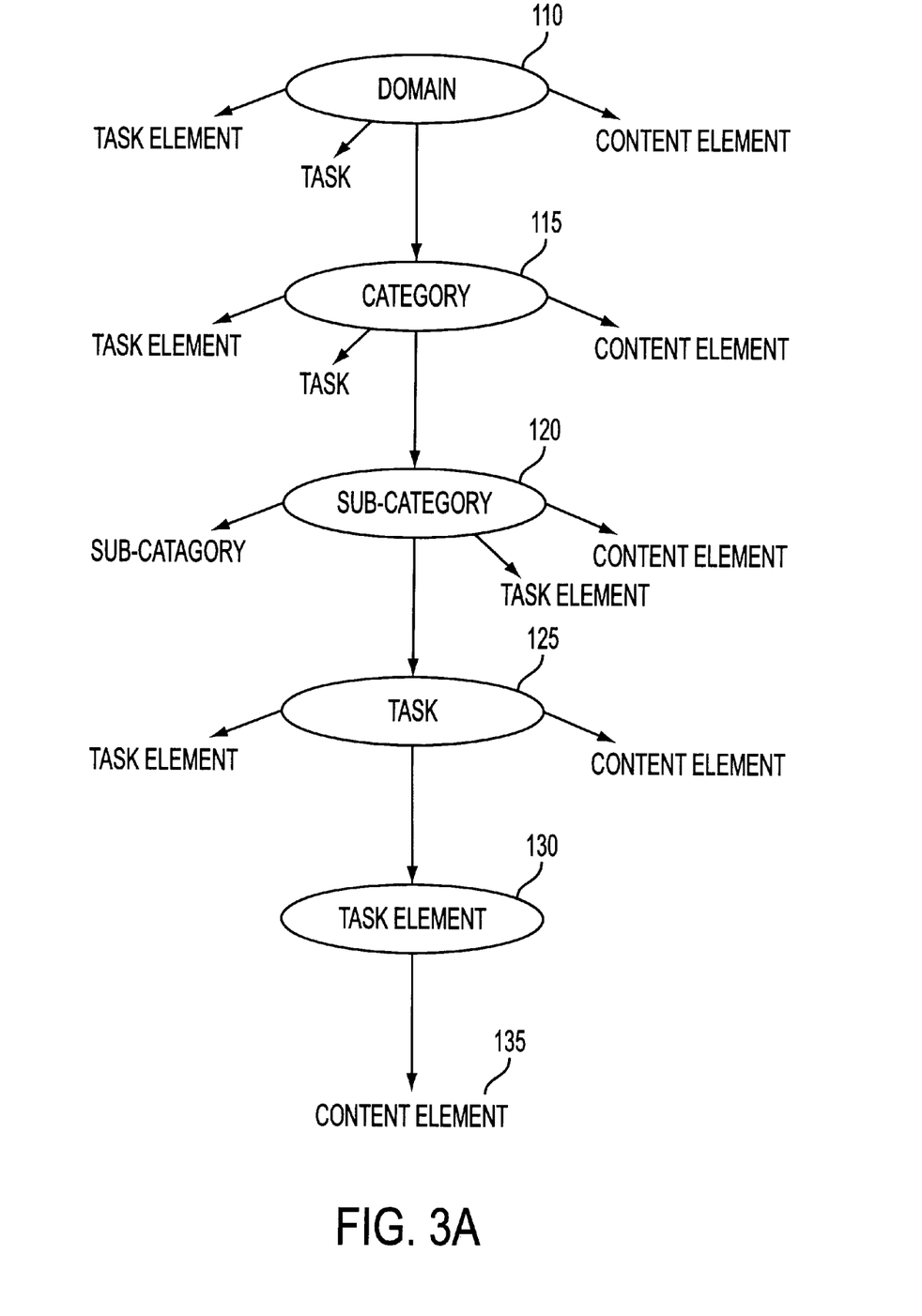
FIG. 3A is a representation of the content hierarchy available for selection by the user including domains, categories, subcategories, content elements, tasks and task elements.

FIG. 3A is a representation of the content hierarchy available for selection by the user. The content hierarchy includes domains 110, categories 115, subcategories 120, tasks 125, task elements 130 and content elements 135, all of which are accessible to the user by pressing the appropriate virtual button on the display at each level of the hierarchy. As seen in FIG. 3A, a very large number of user threads are possible. For example, domains, categories and sub-categories can each have task elements and content elements accessible therefrom. Domain 110 refers to the top or first level display of virtual buttons for functions such as "AT WORK", "AT HOME", "GO TO" and "MY INFO" as explained earlier with reference to FIG. 2A. Category 115 refers to a second level selection dependent on the first level selection or virtual button. For example, when the selected domain is the "AT WORK" domain, corresponding categories are "MAKING COPIES" and "FOLDER ASSEMBLY". Subcategories refer to the different types of categories possible. For example, when "FOLDER ASSEMBLY" is selected as the category, dependent sub-categories which may be selected may include "BIG FOLDERS" AND "SMALL FOLDERS". The job of "FOLDER ASSEMBLY" can be classified as a CATEGORY 115 and can also be classified as a TASK 125 depending on its position in the hierarchy. A TASK ELEMENT 130 refers to one of the particular steps or components required to complete a task. A task element can take the form of textual or graphic visual content and can be accompanied by audio prompts and content. Examples of TASK ELEMENTS are shown in FIG. 2C as task elements 101, 102, 103 and 104. A CONTENT ELEMENT 135 is a piece of information or content helpful to the user and which is requested by the user. A content element can take the form of audio, textual or graphic visual content.

Figure 3B:
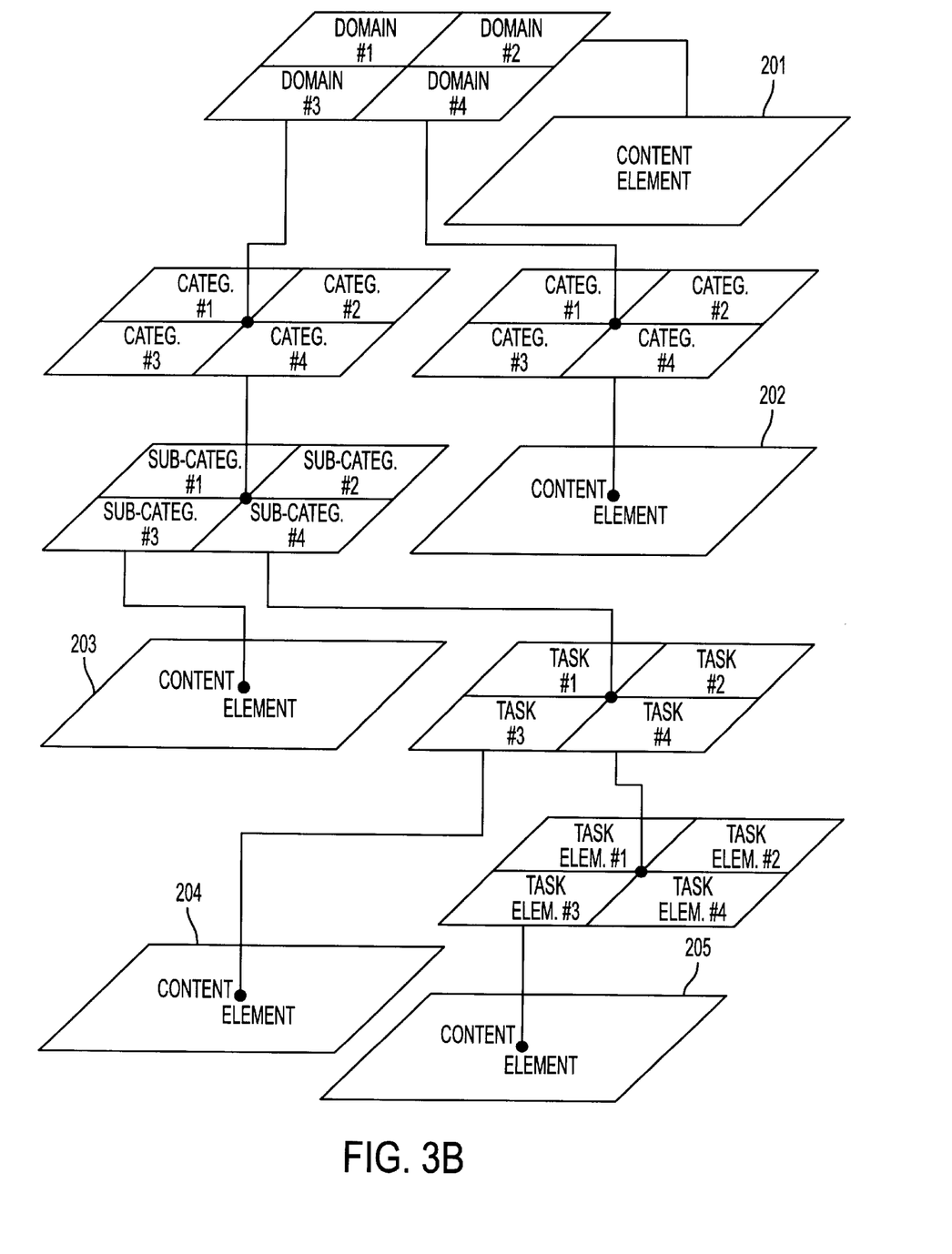
FIG. 3B is a detailed example of one conceptual content structure in accordance with the content hierarchy of FIG. 3A.

FIG. 3B is a detailed example of one particular content structure complying with the content hierarchy of FIG. 3A. In FIG. 3B, four top or first level domains are depicted and are designated as DOMAIN #1, DOMAIN #2, DOMAIN #3 and DOMAIN #4. These domains correspond respectively to the "AT WORK", "AT HOME", "GO TO" and "MY INFO" domains of FIG. 2A. Of course, other domains can be used in place of these domains depending on the particular application and the cognitive level and needs of the particular user. A content element 201 is shown dependent on DOMAIN #2. Thus, when the user presses the virtual button on the display representing DOMAIN #2, the content information corresponding to content information 201 is presented to aid the user.

Dependent from DOMAIN #3, FIG. 3B shows four categories labeled CATEG. #1, CATEG. #2, CATEG. #3, and CATEG. #4. Categories include such operations as MAKING COPIES, FOLDER ASSEMBLY (as already discussed), TAKING MESSAGES and FILING. Dependent from DOMAIN #4, FIG. 3B also shows four categories labeled CATEG. #1', CATEG. #2', CATEG. #3', and CATEG. #4'. By way of example, a CONTENT ELEMENT 202 is dependent on CATEG. #4'. Thus, when the user selects and presses the virtual button corresponding to CATEG. #4', CONTENT ELEMENT 202 is presented (textually, graphically or aurally via speaker 25.)

By way of example, it is seen that when CATEG. #4 is selected by the user, four sub-categories appear on the display, namely SUB-CATEG #1, SUB-CATEG #2, SUB-CATEG #3, and SUB-CATEG #4. In this particular example, when the user selects SUB-CATEG #3, a content element 203 is output to the user either on the display or aurally via speaker 25. Also in this example, when the user selects SUB-CATEG #4 by pressing the corresponding virtual button, four tasks appear on the display. These tasks are designated TASK #1, TASK #2, TASK #3, and TASK #4 as shown in FIG. 3B. By way of example, when the user selects the virtual button corresponding to TASK #3, a content element 204 is output to the user. In this particular scenario, when the user selects TASK #4, four task elements are displayed on the display to aid the user. These four task elements are designated TASK ELEM #1, TASK ELEM #2, TASK ELEM #3 and TASK ELEM #4 as shown in FIG. 3B. By way of example, when the user selects TASK ELEM #3 by pressing the corresponding virtual button, a content element 205 is output to the user.

Figure 4A:
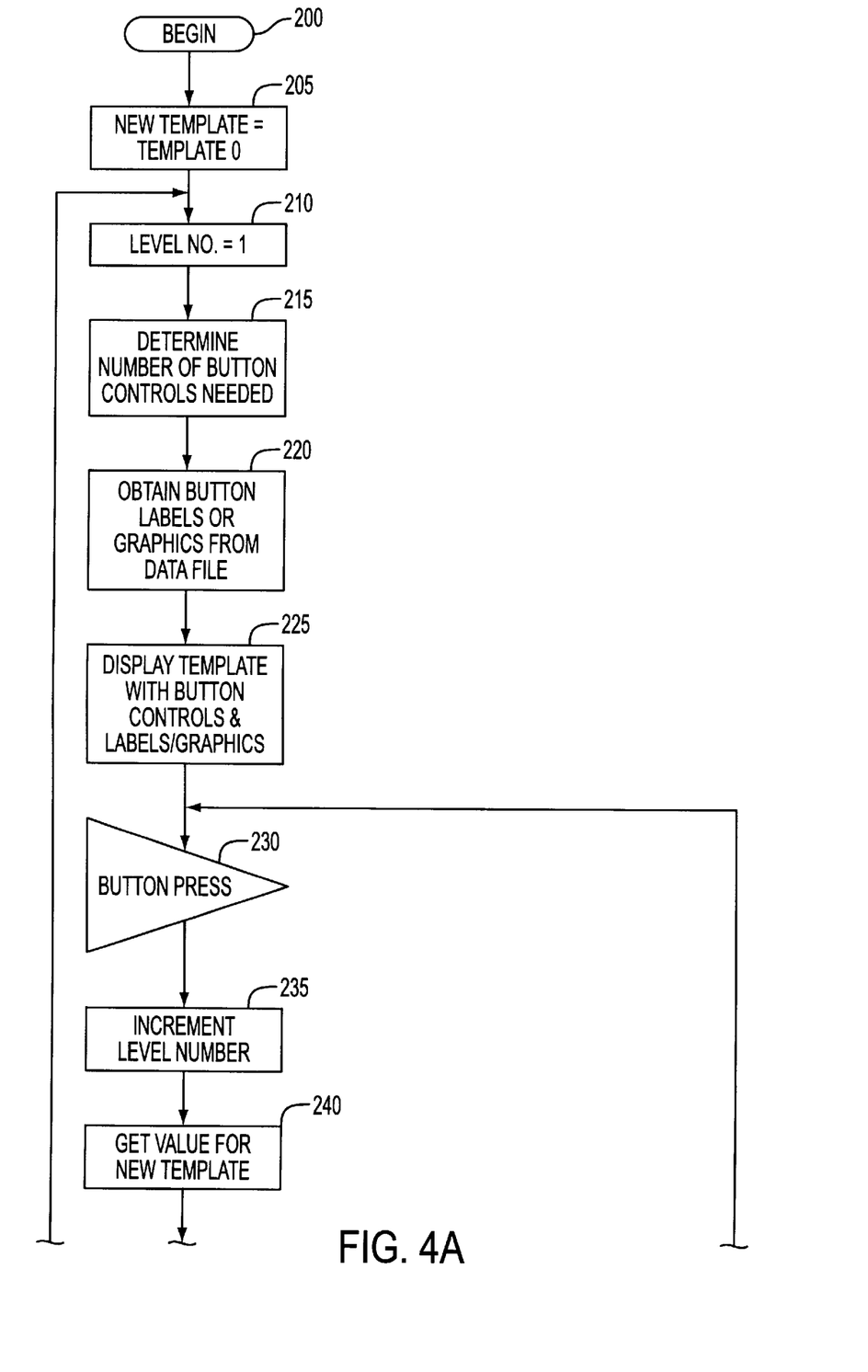
FIG. 4A is a portion of a flowchart illustrating the step by step operation of the disclosed portable computer apparatus, namely the end-user subsystem thereof.
Figure 4B:
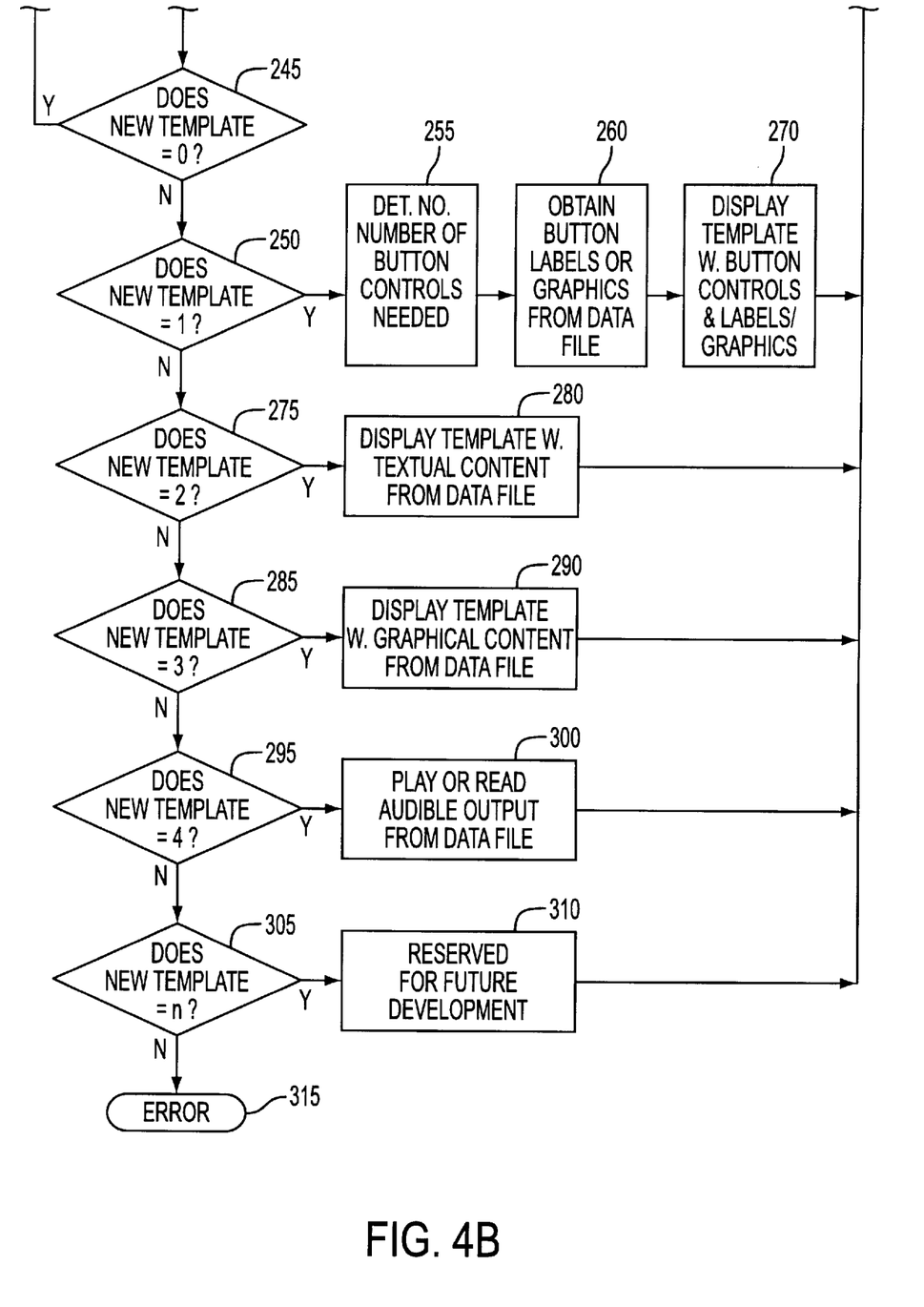
FIG. 4B is the remaining portion of the flowchart for the end-user subsystem of FIG. 4A.

FIGS. 4A and 4B together form a flowchart which represents the program code stored in memory in the portable computer apparatus to control the operation of the device. This code represents the end-user subsystem of the portable computer device. As indicated in FIG. 4A, operation of the portable computer device starts at the BEGIN block 200 at which the portable computer apparatus is initialized and powered up. Flow then continues to block 205 at which the NEW TEMPLATE value is set to Template 0 and the level number is set to 1 as per block 210. At this point it is helpful to refer to Table 1 below which shows various templates and their corresponding function:

TABLE 1

| Template 0 | Top Level Button Controls |
| Template 1 | Sublevel Button Controls |
| Template 2 | Display of Textural Output |
| Template 3 | Display of Graphical Output |
| Template 4 | Sublevel Button Controls for Audible Output |

From block 210 flow then proceeds to block 215 at which the number of button controls needed is determined. The button labels or graphics are then retrieved from a data file in memory as per block 220. The current template including the appropriate retrieved button controls, labels and graphics is then displayed as per block 225. The computer then waits for the user to press one of the displayed buttons as indicated at block 230. When the user presses a virtual button, the level number is incremented as per block 235. The computer then gets a value for NEW TEMPLATE as per block 240.

As shown in FIG. 4B, a test is now conducted at decision block 245 to determine if NEW TEMPLATE=0. If NEW TEMPLATE=0, then process flow continues back to block 210 where the level number is reset to 1. However, if NEW TEMPLATE is not found to equal 0, then further testing is conducted at decision block 250. More particularly, at decision block 250, a test is conducted to determined if NEW TEMPLATE=1. If NEW TEMPLATE=1, then the number of button controls needed is determined at block 255. Button labels or graphics are then obtained from a data file in memory as per block 260. The current template is then displayed with appropriate button controls and labels or graphics as indicated at block 270. Process flow then continues back to block 230 at which the computer continues to monitor for a button push by the user.

Alternatively, if at decision block 250, it is determined that NEW TEMPLATE does not equal 1, then further testing is conducted at decision block 275. More particularly, a test is conducted at block 275 to determine if NEW TEMPLATE=2. If NEW TEMPLATE is found to equal 2, then the computer displays a template containing textual content from a stored data file as per block 280. Process flow then continues back to block 230 at which the computer waits for the user to press a virtual button.

However, if at decision block 275, it is determined that NEW TEMPLATE does not equal 2, then additional testing is conducted at decision block 285 to determine if NEW TEMPLATE=3. If NEW TEMPLATE is found to equal 3, then the computer displays a template containing graphical content from a stored data file as per block 290. Process flow then continues back to block 230 at which the computer waits for the user to press a virtual button.

Alternatively, if at decision block 285, it is determined that NEW TEMPLATE does not equal 3, then further testing is conducted at decision block 295 to determine if NEW TEMPLATE=4. If NEW TEMPLATE is found to equal 4, then the computer plays or reads audible output from a stored data file as per block 300. Process flow then continues back to block 230 at which the computer waits for the user to press a virtual button.

However, if at decision block 295, it is determined that NEW TEMPLATE does not equal 4, then additional testing is conducted at decision block 305 to determine if NEW TEMPLATE=n wherein n is a number selected for use in future development. If NEW TEMPLATE is found to equal n, then the computer displays a template containing future development content from a stored data file as per block 310. Process flow then continues back to block 230 at which the computer waits for the user to press a virtual button. If at decision block 305, NEW TEMPLATE is not found to equal n, then an error state is entered as per block 315.

Figure 5:
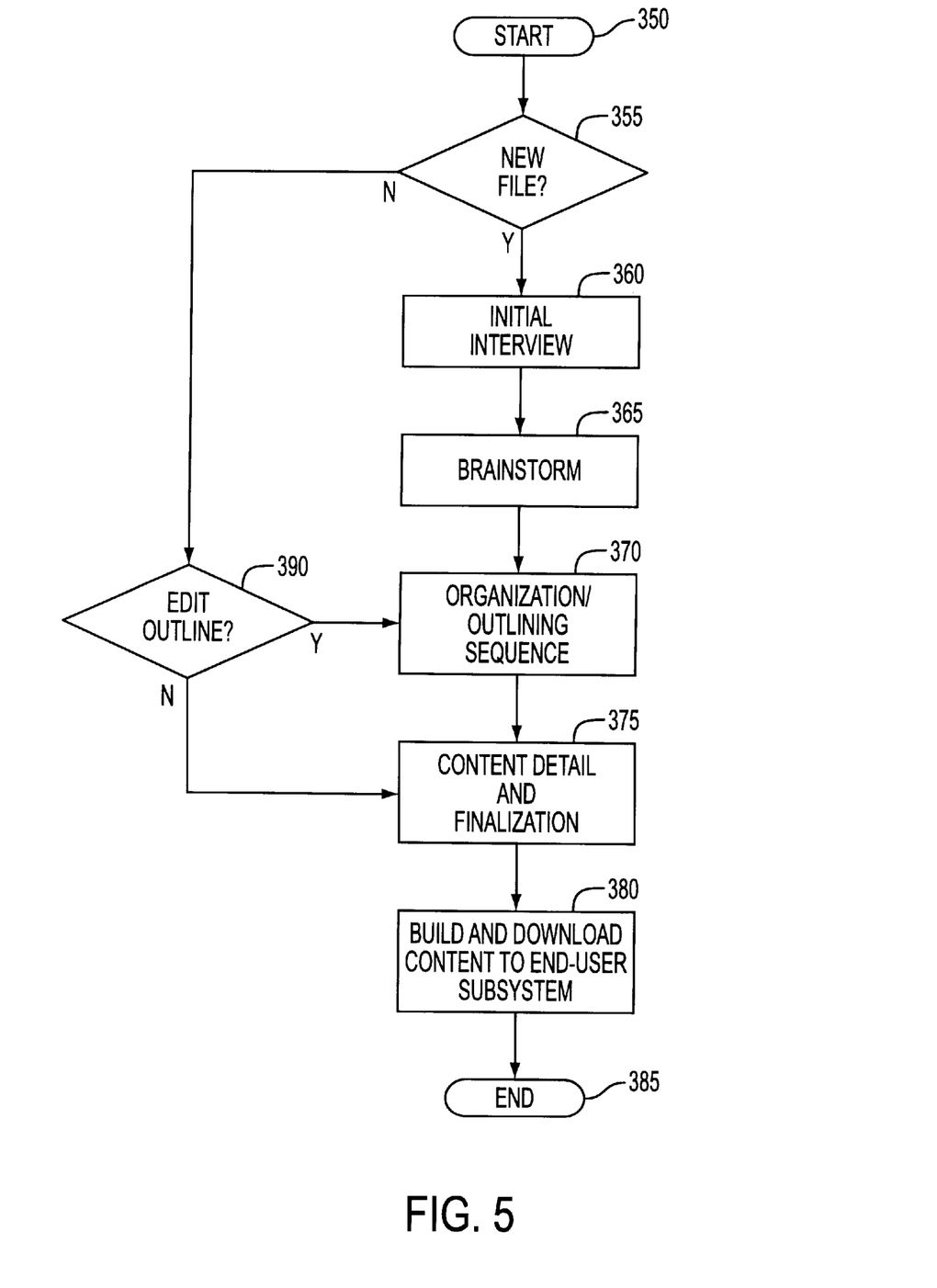
FIG. 5 is a flowchart illustrating the authoring subsystem.

FIG. 5 is a flowchart which provides a high level overview of the authoring subsystem used to develop the information hierarchy and content elements that will be presented by the disclosed portable computer apparatus 10. It is contemplated that a practitioner or family member will use the authoring subsystem, hosted on a PC, to set up the portable computer 10 to provide assistance to the user according to the user's particular needs and cognitive abilities. Process flow starts at START block 350. A test is then conducted at decision block 355 to determine if the author is creating a new file or if the author desires to access and edit an old file.

If it is found that a new file is to be created, then an initial interview is conducted with the user as per block 360 to determine the size, number and other characteristics of the user's subsystem virtual buttons. Brainstorming is then performed to determine the user's needs as per block 365. The user's needs are then organized into an outline sequence as per block 370. The content detail, namely the content elements—textual, graphical or audible outputs—are finalized in accordance with the needs and cognitive level of the particular user as per block 375. The content hierarchy thus determined is downloaded to the end-user subsystem on the portable computer apparatus as per block 380. That computer is then ready to assist the user in the user's life environment at end block 385.

If at decision block 355, it is found that a new file is not to be created, then a decision is made at decision block 390 to find if an existing outline is to be edited. If an existing outline is to be edited, then the outline is edited at block 370. If however the outline is not to be edited, the content detail and finalization is performed as per block 375. The content hierarchy thus determined is downloaded to the end-user subsystem on the portable computer apparatus as per block 380. The modified computer is now again ready for assisting the user.

Figure 6:
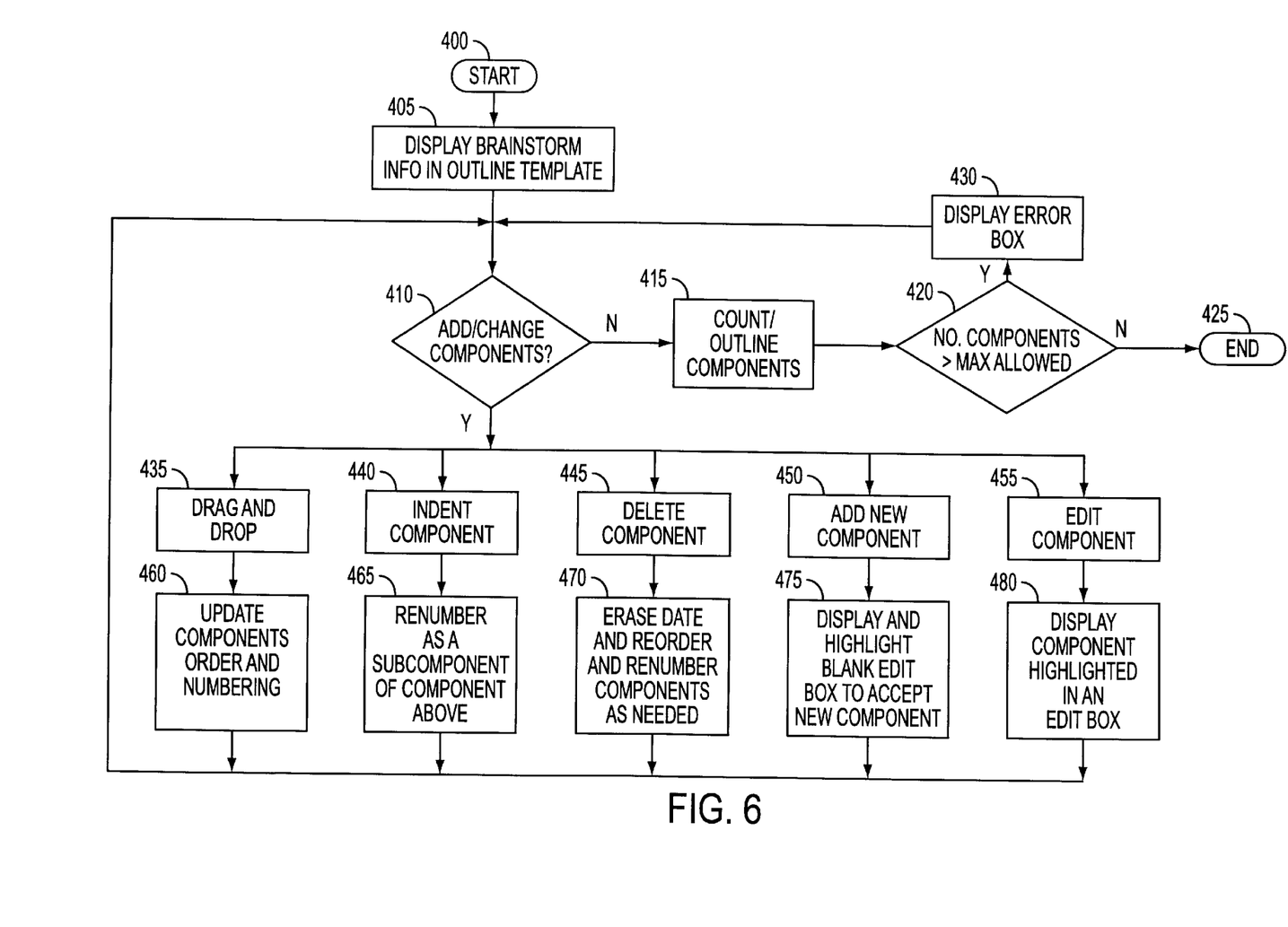
FIG. 6 is a flowchart illustrating the organization and outlining sequence for the authoring subsystem of the portable computer apparatus.

FIG. 6 is a more detailed flowchart illustrating the organization and outlining sequence for the authoring subsystem. As a prelude to the following discussion of the outlining sequence of the authoring subsystem, it is noted that organizing the information needed to "author" or program the portable computer to the needs of the particular person involves a plurality of steps. These steps include 1) the author interviewing the cognitively impaired person and others to ascertain the user's needs and cognitive level; 2) taking an information inventory (brainstorming) to determine the user's daily activities, life tasks, events and times in more detail; 3) organizing; and 4) creating a hierarchy or structure for operating the portable computer apparatus, as discussed subsequently. More particularly, the author starts at start block 400. After interviewing the cognitively impaired person and others to determine his or her needs, the brainstorm information is displayed in an outline template on the display as per block 405. Brainstorm information includes information regarding the user's needs such as the need to navigate from home to work, the need to perform filing at work, the need to access personal information at home, and the like.

A decision regarding whether or not to add or change components is made at decision block 410. If the decision is made not to add or change components at block 410, then a count of outline components is performed at block 415. A test is then conducted at decision block 420 to determine if the author is attempting to use more than the maximum number of components allowed. For example, in the embodiment shown, four components or virtual buttons are displayed as a maximum on the display at any one time. This number is based on the size of the display and the abilities of the user. If the number of components is not greater than the maximum number of components allowed the routine is terminated at END block 425. If however the number of components is found to be greater than the maximum number of components allowed, then an error is displayed as per block 430 and process flow continues back to the add/change components decision block 410.

If at decision block 410 it is determined that components are to be added or changed, then process flow continues to any one of five possible selections, namely, drag and drop block 435, indent component block 440, delete component block 445, add new component block 450 and edit component block 455. If a drag and drop operation is performed by the author to change or move a component as per drag and drop block 435, then the order of the components and the numbering of the components is updated at block 460. Process flow then continues back to add/change components decision block 410. If a component is indented as per block 440, then that component is renumbered as a subcomponent of the component above as per block 465. Process flow then continues back to add/change components decision block 410. If a component is deleted as per block 445, then the data associated with that component is erased from memory and the components are reordered and renumbered as per block 470. Process flow then continues back to add/change components decision block 410.

If a new component is to be added as per block 450, then a blank edit box is displayed and highlighted on the display to accept a new component as per block 475. Process flow then continues back to add/change components decision block 410. If an existing component is to be edited, then that component is displayed in a highlighted edit box as per block 480. Again, process flow then continues back to add/change components decision block 410.

It is noted that the number of buttons created and their sizes are selected to be appropriate to the needs of the particular user. For example, a user with a relatively poor vision or lack of motor skills may require fewer and larger virtual buttons than a user with higher skills and abilities. Also, if timed prompts are desired, a time prompt interval is selected for selected events such as tasks and task elements. In other words, an alarm with associated visual or aural content is set to notify the user of a particular event. In this manner, the portable computer provides assistance in the form of a reminder to perform a certain task at a certain time or about time-based job or task performance measures, out of sequence performance, etc.

Figure 7A:
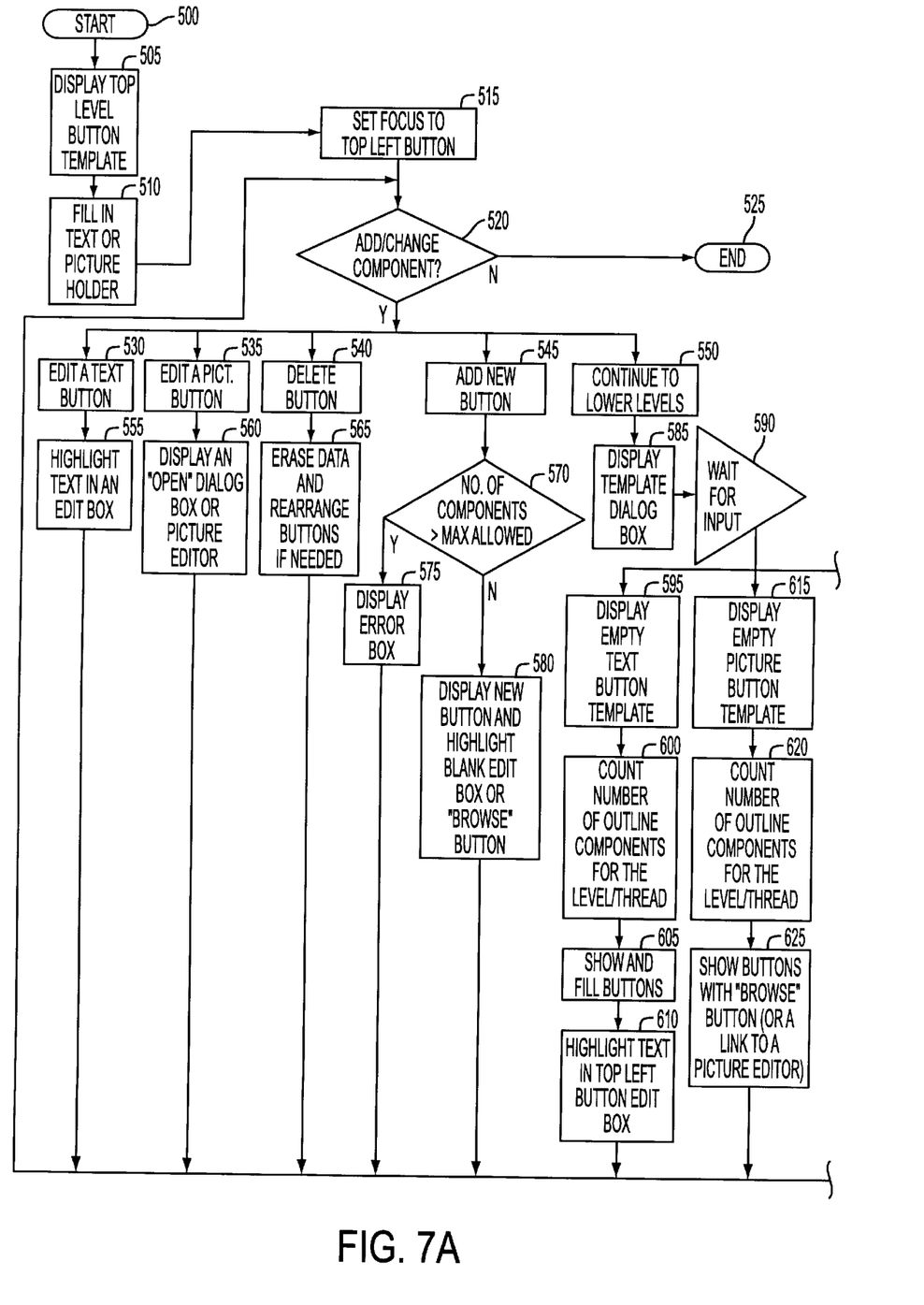
FIG. 7A is a portion of a flowchart illustrating the content detail and finalization for the authoring subsystem depicted in FIG. 5.
Figure 7B:
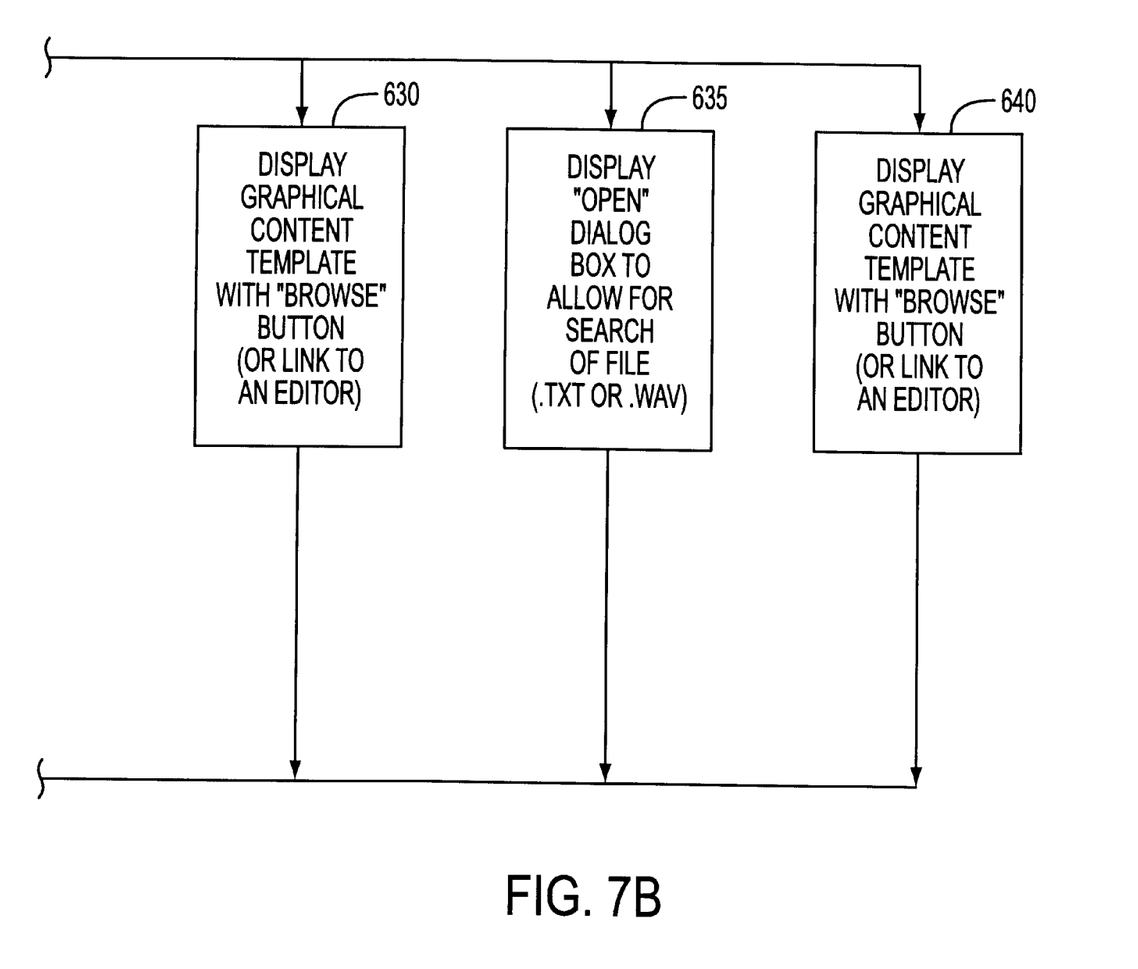
FIG. 7B is the remaining portion of the flowchart for the authoring subsystem of FIG. 7A.

FIGS. 7A and 7B together form a flowchart illustrating the content detail and finalization for the authoring subsystem depicted in FIG. 5. The process commences at START block 500 as seen in FIG. 7A. The top level or first level virtual button template is displayed at block 505 after which a fill-in text or picture holder block 510 is executed. The focus is then set to the top left button on the display at block 515 as the starting point for editing. A decision is then made at decision block 520 as to whether or not to add or change a component. If it is decided that a component is not to be added or changed, then the content detail and finalization ends at block 525 and the authoring process continues building and downloading content to the end user subsystem on the portable computer apparatus.

If it is determined that a component is to be added or changed, then process flow continues to an appropriate one of the following process blocks depending on the particular function to be performed, namely, edit a text button block 530, edit a picture button block 535, delete button block 540, add new button block 545 and continue to lower levels block 550.

If the author desires to edit a text button then flow continues through block 530 and the text to be edited is displayed and highlighted in an edit box as per block 555. Process flow then continues back to the add/change components decision block 520. If the author desires to edit a picture button then flow continues through block 535 and an "open" dialog box is displayed or the picture editor is launched as per block 560. Process flow then continues back to the add/change components decision block 520. If the author desires to delete a particular button then flow continues through block 540 and the data corresponding to the button to be deleted is erased from memory and the remaining virtual buttons are rearranged on the display as needed as per block 565. Process flow then continues back to the add/change components decision block 520.

If a new button is to be added, then a check is performed at decision block 570 to determine if the number of buttons requested at the particular level exceeds the maximum number allowed. If the number of buttons requested exceeds the prescribed maximum, then an error is displayed as per block 575. Once again, process flow continues back to the add/change components decision block 520. If the number of buttons requested does not exceed the prescribed maximum, then a new button is displayed and a blank edit box is highlighted as per block 580. Again, process flow continues back to decision block 520.

If the author decides to continue to a lower level, flow continues through block 550 and a template dialog box is displayed as per block 585. The authoring subsystem then waits for input at block 590. Five process paths are now possible depending on the desires of the author. If desired by the author, an empty text button template is displayed as per block 595. Then, the number of outline components for the particular level and thread are obtained and counted as per block 600. The buttons are displayed and data is filled in at block 605. Highlighted text is then displayed in the top left button edit box as the starting point for editing. Process flow then continues back to decision block 520.

Alternatively, if desired by the author, an empty picture button template is displayed as per block 615. Then, the number of outline components for the particular level and thread are counted as per block 620. The buttons are now displayed with a "browse" button or a link to a picture editor is established. The buttons are then shown with a "browse" button or a link to a picture editor as per block 625. Process flow then continues back to decision block 520.

Alternatively, if desired by the author, a graphical content template is displayed with a "browse" button as indicated at block 630 in FIG. 7B. Again, process flow continues back to decision block 520. However, if the author desires, an "OPEN" dialog box is displayed to permit a search of a file (e.g. a .TXT or .WAV file) as per block 635. Process flow then continues back to decision block 520. Alternatively, if the author desires, the computer displays a graphical content template with a "BROWSE" button or a link to an editor as per block 640. Again, process flow then continues back to decision block 520.

Appendix 1 shows an example of a hypothetical content structure authored and downloaded into portable computer device 10 to assist a cognitively impaired person. The hierarchy of the content structure includes top level domains, categories, sub-categories, tasks and content elements as described earlier. In Appendix 1, the top level screen virtual button labels (domains) are labeled 1, 2, 3 and 4. Screen virtual button labels are shown in non-italic type next to the domain, category, sub-category, task and content element labels. Actual virtual button labels may be text or graphics or a combination of text and graphics, depending on the individual user. Detailed content delivered to the user is indicated in italic type. Unless otherwise indicated, the specific content and how it is delivered (text, audio, or graphic) depends on details of the information and the individual user. To access content, the user progresses through the information hierarchy starting from the top level (domains) until reaching the content delivery point. To provide an example of one thread which the user might pursue to get information about how to get home from work, the user first presses virtual button 1 ("Going to . . . "). Then, from the next screen display the user presses virtual button 1b ("Home from work"). Subsequently, from the next screen display, the user presses virtual button 1bi to obtain the actual content (step by step directions for getting home from work) delivered to the display. While a computer apparatus for assisting a cognitively impaired person is described above, it is clear that a method of operating the computer apparatus to aid the cognitively impaired person is also disclosed. More particularly, a method of operating a portable computing apparatus for enabling a cognitively impaired person to function in a living environment is provided. The method includes the step of displaying a plurality of first level virtual buttons on the display. Each first level virtual button corresponds to different selectable content domain. The first level virtual buttons are configured to correspond to the abilities and life needs of a particular cognitively impaired person. The method also includes the step of detecting selection of one of the first level virtual buttons by the cognitively impaired person. The method further includes the step of modifying the display, in response to detecting selection of one of the first level virtual buttons, to display a second level of virtual buttons or information content to the person.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A method of enabling a cognitively impaired person to function in a living environment, comprising the steps of:
   maintaining, in a computer program memory, data corresponding to the abilities and life needs of a particular cognitively impaired person;
   displaying, on a display at least one first level virtual button, each first level virtual button corresponding to a different selectable content domain, each first level virtual button being tailored to the abilities and life needs of the particular cognitively impaired person;
   detecting activation of one of the first level virtual buttons by the cognitively impaired person; and
   modifying the display, in response to detecting activation of one of the first level virtual buttons, to display a second level of virtual buttons tailored to the abilities and life needs of the particular cognitively impaired person, or information content tailored to the abilities and life needs of the particular cognitively impaired person, or both.

2. The method of claim 1 wherein a second level virtual button corresponds to selectable content category.

3. The method of claim 1 wherein a second level virtual button corresponds to selectable content subcategory.

4. The method of claim 1 wherein a second level virtual button corresponds to a task.

5. The method of claim 4 wherein audio information is associated with the second level virtual button.

6. The method of claim 1 wherein a second level virtual button corresponds to a task element.

7. The method of claim 6 wherein audio information is associated with the second level virtual button.

8. The method of claim 1 wherein selection of a second level or lower level virtual button causes information content to be presented to the person.

9. The method of claim 8 wherein audio information is associated with the second or lower level virtual button.

10. The method of claim 1 wherein selection of a second level or lower level virtual button causes subsequent virtual buttons to be displayed to the person.

11. The method of claim 1 wherein the size and number of virtual buttons displayed at each level are dependent on the abilities of the person.

12. The method of claim 1 wherein the virtual buttons include respective text labels identifying the functions thereof, the text labels being dependent on the abilities of the person.

13. The method of claim 1 wherein the virtual buttons include respective graphics labels identifying the functions thereof, the graphics labels being dependent on the abilities of the person.

14. The method of claim 6 further comprising the step of displaying task element virtual buttons on the display including a graphic image representing the visual appearance of a completed task element.

15. The method of claim 1 further comprising the step of displaying at least one virtual button on the display, at least one of the virtual buttons representing the state of a first task element at a point when the cognitively impaired person has correctly performed the first task element, such that the person can indicate to the apparatus the accomplishment of each task element by activating a respective virtual button when the corresponding step is achieved.

16. The method of claim 1 wherein prompts are presented by means of displayed text and/or graphics and/or video, audio output, and/or other media based upon at least one condition selected from the group of elapsed time since an input or event, the order of the inputs, the time of day, and the day.

17. A portable computing apparatus for enabling a cognitively impaired person to function in a living environment comprising:
   a display for presenting output information to a cognitively impaired person and for receiving input information from the person, the output information and the input information corresponding to the cognitively impaired person;
   a processor communicative with the display, for providing output information to the display and receiving the input information from the display; and at least one non-volatile memory, communicative with the processor, for storing customized data indicative of instructions for instructing the person how to perform an activity and program code which, when executed by the processor, presents at least one first level button on the display for selecting by the person, each first level virtual button corresponding to a different selectable category, each first level virtual button being configured to correspond to the abilities and life needs of the cognitively impaired person.

18. The portable computing apparatus of claim 17 wherein the program code when executed by the processor detects selection of one of the first level virtual buttons by the person and in response causes a second level virtual button or information content to be displayed on the display, or otherwise delivered to the person, a hierarchy of selections thus being formed.

19. The portable computing apparatus of claim 18 wherein the second level virtual button is a second level task button which represents a task to be accomplished by the person with subsequent instruction from the apparatus via the display.

20. The portable computing apparatus of claim 19 wherein the program code associates audio information with the second level virtual button.

21. A computer program memory storing computer instructions therein for augmenting a cognitively impaired person's ability to function in a living environment, the computer instructions comprising the steps of:

maintaining, in a computer memory, data indicative of instructions tailored to help a cognitively impaired person perform at least one life activity;

displaying, via a display device, at least one first level virtual button, each first level virtual button associated with one of the life activities and the cognitively impaired person;

detecting, via an input device, activation of first level button by the cognitively impaired person; and presenting, in response to the activation of the first level virtual button by the cognitively impaired person, at least one second level virtual button, information content, or both, to the cognitively impaired person, the second level virtual button, information content or both corresponding to the instructions tailored to help the cognitively impaired person perform the life activity associated with the first level virtual button.

22. The method of claim 21, wherein the presenting step is implemented via the display device.

23. The method of claim 21, wherein information content is presented in the presenting step and wherein the presenting step is implemented via an audio presentation device.

24. The method of claim 21, comprising the additional steps of detecting an activation of a second level virtual button by the person and presenting information content corresponding to the instructions tailored to help the person perform the life activity associated with the first level virtual button.

25. A method of assisting a cognitively impaired person function in a living environment, comprising:

obtaining information corresponding to the life activities and needs of a particular cognitively impaired person;

entering into a computer program memory at least one component, each component corresponding to one of the life activities or needs of the particular cognitively impaired person; and selecting a presentation corresponding to each component and the cognitively impaired person.

26. The method of claim 25, comprising the additional step of entering data associated with at least one of the components, the data relating to the information corresponding to the life activities and needs of the person.

27. The method of claim 26, comprising the additional step of selecting a presentation corresponding to the data.

28. The method of claim 25, comprising the additional step of associating a prompt with a component.

29. The method of claim 28, wherein the prompt is operative to convey content to the person.

30. The method of claim 25, wherein the presentation corresponding to each component includes at least one of graphics, text, and audio.

31. The method of claim 27, wherein the presentation corresponding to the data includes at least one of graphics, text and audio.

32. A method of assisting a cognitively impaired person to function in a living environment, comprising the steps of:

maintaining, in a computer program memory, data corresponding to the abilities and life needs of a particular cognitively impaired person;

presenting a prompt to the cognitively impaired person relating to a task to assist the cognitively impaired person in performing the task, the prompt corresponding to the abilities and life needs of the cognitively impaired person; and detecting a response to the prompt from the cognitively impaired person.

\* \* \* \* \*

UNITED STATES PATENT AND TRADEMARK OFFICE
CERTIFICATE OF CORRECTION

PATENT NO. : 6,225,920 B1  Page 1 of 1
DATED : May 1, 2001
INVENTOR(S) : Randy A. Dayle It is certified that error appears in the above-identified patent and that said Letters Patent is hereby corrected as shown below:

<u>Title page,</u>
Insert:

-- Related U.S. Application Data

[60] This application claims priority to U.S. Provisional Application No. 60/042,998, filed on April 14, 1997. --

Signed and Sealed this

Twenty-sixth Day of March, 2002

*Attest:*

JAMES E. ROGAN
*Attesting Officer*  *Director of the United States Patent and Trademark Office*